May 3, 1932.  G. R. VALDEZ  1,856,673

OILER FOR ENGINES

Filed March 24, 1927

Inventor
Gilberto R. Valdez
By his Attorney

Patented May 3, 1932

1,856,673

UNITED STATES PATENT OFFICE

GILBERTO R. VALDÉZ, OF NEW YORK, N. Y.

OILER FOR ENGINES

Application filed March 24, 1927. Serial No. 177,903.

This invention relates to an oiler for engines and the like, and a particular object of the invention is to provide a simple, practical and efficient means for properly and economically oiling the bearings of reciprocating parts, such for instance as the bearings at the opposite ends of the connecting rods between the crank shaft and the cross-head in a vertical reciprocating engine.

In engines of the vertical reciprocating type it has heretofore been the common practice to lubricate these pivot connections by periodically dropping oil either directly upon the bearings or into a cup arranged to receive the oil and conduct it to the bearings. The dropping of oil in this manner is objectionable primarily in that it causes a goodly proportion of the oil being splashed about over the engine and over adjacent objects and results in either the insufficient lubrication of the bearings or the consumption of a much greater quantity of oil than is necessary for adequate lubrication. Owing to the erratic drafts of air produced by the rapidly moving parts of the engine, or otherwise, many drops fall wholly clear of the engines, being wafted away by the air currents particularly at times when the moving bearings are at relatively great distances from the oil dropping contrivance. At the other times drops of oil will impinge against the bearing parts, or against wall parts of the cup when said parts are moving rapidly upwardly toward the descending drops, in which instances the force of impact causes instant dissipation of much of the oil as a mist or spray away from the bearing.

It is the purpose of the present improvement to overcome these objections and to provide for the proper lubrication of the moving bearings without attendant loss of any of the oil.

It is a further object of the present invention to provide means for attaining efficient lubrication of the bearings at all times notwithstanding material temperature changes.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Figure 1:
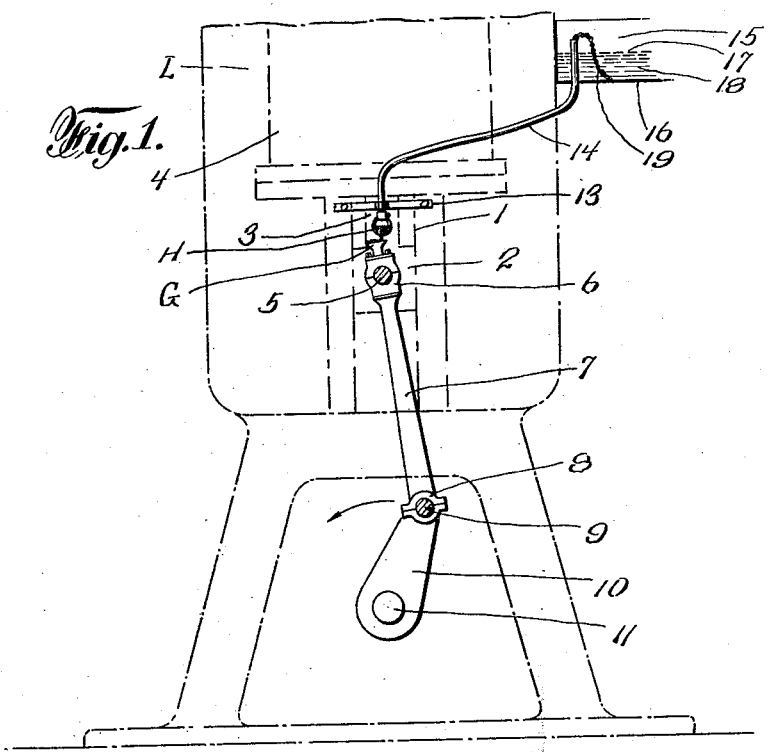
Figure 2:
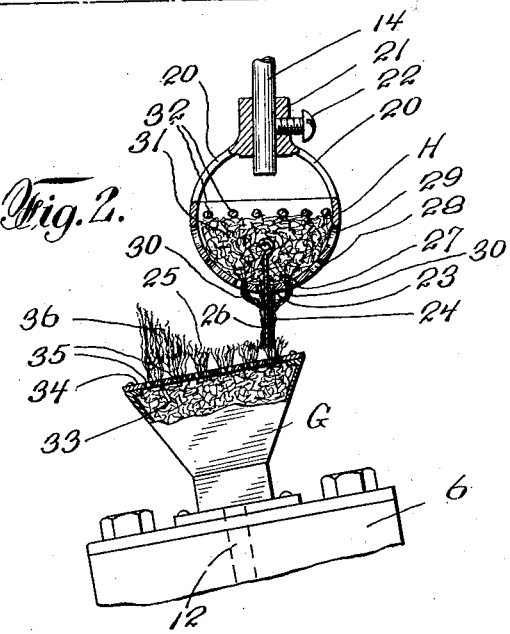

Fig. 1 is a diagrammatic view illustrating a portion of a vertical reciprocating engine having moving bearings and illustrating the application of the present improvement thereto, and Fig. 2 is an enlarged detail view of a part of the device seen in Fig. 1, parts of said figure being shown in vertical section for disclosing the manner of construction and operation thereof.

Referring to the drawings for describing in detail the structure illustrated therein, the reference character L indicates in outline the form of a suitable type of vertical reciprocating engine providing the usual guideway 1 within which moves cross-head 2, piston rod 3 being connected with said cross-head and extending into the cylinder 4, all in the usual or any suitable manner.

The cross-head 2 carries wrist pin 5 upon which is journaled the upper bearing 6 of the connecting rod 7, the lower bearing as 8 of said connecting rod being pivotally connected with the crank pin 9 attached to crank 10 of main shaft 11.

At a suitable point upon the bearing part 6, preferably upon the upper surface thereof, is arranged an oil receiving cup G having of course a suitable oil passage as 12 extending therefrom to the wrist pin 5.

A second oil cup, with appropriate passage or conduit, may be provided opposite the cup G for conducting oil downwardly to the crank pin 9, or the same cup G may have two passage-ways or conduits as 12 extending therefrom one communicating with the wrist pin 15 and the other with the crank pin 9, as will be readily understood. It is deemed sufficient here however to show only a single cup and conduit, with the understanding that any number of additional cups or of additional conduits from the same cup, may have communication with different moving bearings as may be required in different cases.

Supported in position above the uppermost point reached by the cup G in its up and down movements is a feed cup H. A bracket as 13, or other appropriate device may be employed to hold this feed cup in position.

An oil pipe 14 extends from the feed cup H upwardly to a suitable oil reservoir 15 from whence oil may be conducted downwardly by means of said pipe to the feed cup H, and thence to the cup G as will now be described in detail, it being borne in mind that there may be as many of the pipes 14 leading from reservoir 15 to feed cups H as may be desired, and that there may be one or more feed cups for each cup G according to preference and requirements, the single reservoir 15 being thus adapted to serve any number of engines, or any number of moving bearing parts upon a single engine.

The pipe or pipes 14 extend upwardly through the bottom wall 16 of the reservoir and terminates at a point above the level as 17 of the oil 18 contained in said reservoir. A wick 19 has one end extending downwardly into the open upper end of the pipe and has its other end hanging into the surrounding oil. The siphonic action thus set up causes the oil to be drawn in small quantities from the reservoir and delivered into the pipe. As this arrangement of wick and reservoir is old and well known it will not be further described here except to refer to the fact that the quantity of oil delivered into the pipe by the wick is determined by the position of the wick and that this may be readily manually adjusted at any time.

The feed cup H is preferably of funnel or semi-spherical shape, being open at its upper end to receive the oil dropping downwardly thereinto from the lower end of pipe 14. It may be provided with upwardly extending arms as 20 connected with a central sleeve 21 which is telescoped upon the lower end portion of the pipe 14, a set screw as 22 being provided to hold the sleeve connected with the pipe and incidentally providing for adjustment of the cup upwardly and downwardly, or even rotatably, upon the pipe, the purpose of which will be presently referred to.

Here it should be noted that the bracket 13 above referred to is preferably connected with the pipe 14 so as not to interfere with the up and down and rotary adjustment of the feed cup, or, of course, the adjustment of the feed cup may be effected in any other approved manner.

At its lowermost point the feed cup is formed with a discharge opening as 23 therethrough through which oil dripping from the end of pipe 14 may flow to the cup G.

Extending through this opening 23 is a soft wick 24 which hangs for an appreciable distance below the lowermost extremity of the body of the feed cup.

Projecting upwardly from the cup G is a brush or wiper element 25, also preferably formed of wick material or hair.

The wiper 25, and the wick 24, are of such proportions that when the bearing 6 is at or near its uppermost extremity the lower end of the wick will be intimately engaged by the wiper. Since this occurs at a time when the crank pin 9 is crossing its upper centre, and since the wiper is arranged spaced above the axis of the wrist pin 5, the intimate engagement of the wiper with the wick will continue during an appreciable period while the wiper is moving horizontally and with a decided wiping action against and beneath the lower end portion of the wick. The final period of the wiping action will be accompanied by a downward movement of the wiper, as the wrist pin passes centre and begins its downward stroke.

This intimate engagement and wiping action of the wiper with respect to the wick will cause any superfluous oil which is at the lower end of the wick at the time to be drawn off from the wick and onto the wiper, from whence it will pass into the cup G and be conducted to the appropriate bearing.

Since it sometimes happens that the wick 24 may become short, due to shrinkage, wear, or other causes, in any of which instances the wiper may not be able to reach the wick, it is proposed that one or more metallic rods as 26 may be hung through the opening 23 and within the wick 24 so that the lower end portion of said rod or rods at least will conduct oil to a permanent distance below the lowest extremity of the body of the cup H.

Adjustment of the position of the lower end of the wick, and even of the lower end of the rod 26, may also be effected by moving the entire feed cup upwardly or downwardly along the pipe 14 if such adjustment should at any time become desirable. Also, by adjusting the cup H rotatably upon the pipe 14 any radial face of the wick may be brought into position for best co-operating with the wiper 25.

As a simple means for automatically maintaining a constant delivery of oil from the cup H notwithstanding changes in the fluidity of the oil used, as may result for instance from changes in the temperature of the surrounding atmosphere, or otherwise, the drawings illustrate the feed cup H to be formed with a plurality of openings in addition to the opening 23, that is: at a level slightly above the level of opening 23 is provided one or more openings 27, at a level spaced above the level of openings 27 is one or more openings 28, and at a level spaced above the level of openings 28 is one or more openings 29. The openings 28 and 29 are successively increased in size with respect to the opening 27, from which it will be seen that if the oil is thin, as when greatly heated, it will move readily through the opening 23 and wick 24. If the oil is less fluid it will not so readily flow through the opening 23 which is to a large extent clogged by the wick 24 but will pile up and begin to flow through the openings 27. If the oil is successively less fluid the openings 27 will not be sufficient for its discharge and it will pile up further and begin to flow through the openings 28. If the oil is quite stiff and will not readily flow through any of the previous openings it will pile up and flow through the largest openings as 29.

If desired any or all of the openings 27, 28 and 29 may be provided with auxiliary wicks as 30 extending therefrom and merging into the wick 24 for assisting in the positive delivery of oil to said wick 24, but usually it is sufficient to employ only a single wick 24, the inclining outer surface of the feed cup being in most instances sufficient to conduct the oil to said wick 24 in this case. Where this invention is used upon ship-board it may be desirable to use one or more of the auxiliary wicks with a view to insuring proper delivery of the oil from the openings to the wick 24 in the presence of the ceaseless rolling motion of the ship.

It is usually also desirable, particularly where the invention is installed upon shipboard, to loosely fill the interior of the feed cup H with wick material or hair, as 31, so as to restrain the oil from flowing about within the cup during the rolling of the ship. Such wick or hair filler may be conveniently held in position by any suitable means, as for instance the open grating or the like as 32 illustrated in Fig. 2.

The cup G may be of any appropriate form and construction and it may or may not be filled with wick material as 33, according to preference. The wiper 25 may be of any appropriate construction but for the purpose of illustration is shown to consist of a plate 34 attached to the upper end of the cup and having perforations as 35—35 therethrough through which project the fibres, hairs, or other material comprising the flexible wiper portion proper for engaging the wick 24, the perforations 35 serving not only to accommodate the wiper material but also to conduct the oil downwardly into the interior of the cup.

In order to obtain a more efficient wiping and drawing action of the wiper against the wick 24 the hairs, fibres or other material comprising the wiper proper may be made longer at one side of the cup, as indicated at 36 so that said lengthened hairs or fibres will move laterally against the wick 24 as the crank pin 9 swings over centre, and thus draw downwardly along said wick as the crank pin continues to move around.

The installation of an oiler constructed as herein disclosed will result in the conduct of every drop of oil directly to the bearing upon which it is to be consumed. The action of the wiper against the wick is soft and gentle at all times and no cause is given for any splashing or faulty delivery of the oil. The engine and surrounding machinery may be kept in a neat, clean and attractive condition. Changes in temperature of the engine room will be automatically compensated for so that a constant lubrication of the bearings will be effected, and the consumption of oil will be maintained at a minimum consistent with the proper and efficient lubrication of the engine.

The device is simple and inconspicuous and may be readily attached to co-operative relation with any moving bearing. While the invention is here shown and specifically described with reference to an engine of the vertical reciprocating type, it will be understood that the invention is not limited to use in connection with the particular type of engine, but is to a greater or less extent efficient for the lubrication of moving bearings wherever they may be found regardless of the particular type of engine concerned.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. An oiler for engines, said oiler comprising a wick member, means for feeding oil thereto, an oil cup arranged to move with respect to said wick member and having communication with a part to be lubricated, a perforated partition comprised in said oil cup, a quantity of wick material carried by said oil cup at one side of said partition, and a second quantity of wick material carried by said oil cup at the opposite side of said partition communicating through the perforations of said partition with said first wick material and constituting a brush for engaging said first mentioned wick member to receive oil therefrom.

2. An oiler for engines, said oiler comprising a feed cup having an opening in the bottom thereof, a wick extending through said opening and depending therefrom, means by which to receive oil from said wick, said feed cup having other openings formed through the wall thereof at varying levels spaced above the first opening, and said other openings being successively increased in size upwardly from said first opening.

3. An oiler for engines, said oiler comprising a feed cup having an opening in the bottom thereof, a wick extending through said opening and depending therefrom, means by which to receive oil from said wick, said feed cup having other openings formed through the wall thereof at varying levels spaced above the first opening, said other openings being successively increased in size upwardly from said first opening, and the oil receiving means being in the form of a brush movable into and out of engagement with said wick.

4. An oiler for engines, said oiler comprising a feed cup having an opening in the bottom thereof, a wick extending through said opening and depending therefrom, means by which to receive oil from said wick, said feed cup having other openings formed through the wall thereof at varying levels spaced above the first opening, said other openings being successively increased in size upwardly from said first opening, said oil receiving means being in the form of a brush movable into and out of engagement with said wick, and means by which to adjust said feed cup with respect to said last mentioned means.

5. An oiler for engines, said oiler comprising a feed cup having an opening in the bottom thereof, a wick extending through said opening and depending therefrom adapted to conduct oil from the cup, and said feed cup having another opening formed through the wall thereof at a level spaced above the first opening also adapted to conduct oil from said cup, together with means whereby oil from the second opening will be delivered to said wick.

6. An oiler for engines, said oiler comprising a feed cup having an opening in the bottom thereof, a wick extending through said opening and depending therefrom adapted to conduct oil from the cup, and said feed cup having another opening formed through the wall thereof at a level spaced above the first opening also adapted to conduct oil from said cup, and an auxiliary wick extending from the second opening into contact with the first wick.

7. An oiler for engines, said oiler comprising a feed cup having an opening in the bottom thereof, a wick extending through said opening and depending therefrom adapted to conduct oil from the cup, said feed cup having another opening formed through the wall thereof at a level spaced above the first opening also adapted to conduct oil from said cup, and the exterior surface of said feed cup between said two openings inclining so as to direct oil from the second opening to said wick.

8. An oiler for engines, said oiler comprising a feed cup having an opening in the bottom thereof, a wick extending through said opening and depending therefrom adapted to conduct oil from the cup, said feed cup having another opening formed through the wall thereof at a level spaced above the first opening also adapted to conduct oil from said cup, and the exterior surface of said feed cup between said two openings inclining so as to direct oil from the second opening to said wick, together with an auxiliary wick extending between the second opening and the first wick for assisting in delivery of oil from said second opening to the first wick.

9. An oiler for engines, said oiler comprising a feed cup having an opening in the bottom thereof, a wick extending through said opening and depending therefrom adapted to conduct oil from the cup, said feed cup having another opening formed through the wall thereof at a level spaced above the first opening also adapted to conduct oil from said cup, an auxiliary wick extending from the second opening into contact with the first wick, and said feed cup having a third opening formed through the wall thereof at a level spaced above the second opening also adapted to conduct oil from said cup, together with means whereby oil from the third opening will be delivered to the first wick.

10. An oiler for engines, said oiler comprising a feed cup having an opening in the bottom thereof, a wick extending through said opening and depending therefrom adapted to conduct oil from the cup, said feed cup having another opening formed through the wall thereof at a level spaced above the first opening also adapted to conduct oil from said cup, an auxiliary wick extending from the second opening into contact with the first wick, said feed cup having a third opening formed through the wall thereof at a level spaced above the second opening also adapted to conduct oil from said cup, together with means whereby oil from the third opening will be delivered to the first wick, and a quantity of fibrous material arranged within said feed cup overlying all of said openings.

11. An oiler for engines, said oiler comprising a feed cup having an opening in the bottom thereof, a wick extending through said opening and depending therefrom adapted to conduct oil from the cup, said feed cup having another opening formed through the wall thereof at a level spaced above the first opening also adapted to conduct oil from said cup, together with means whereby oil from the second opening will be delivered to said wick, a quantity of fibrous material arranged within the feed cup arranged to overlie both of said openings, and a metallic rod having one of its ends within the cup in contact with said fibrous material said rod projecting through one of said openings and having its other end in contact with said wick.

In testimony whereof I affix my signature.

GILBERTO R. VALDÉZ.